Figure 1:
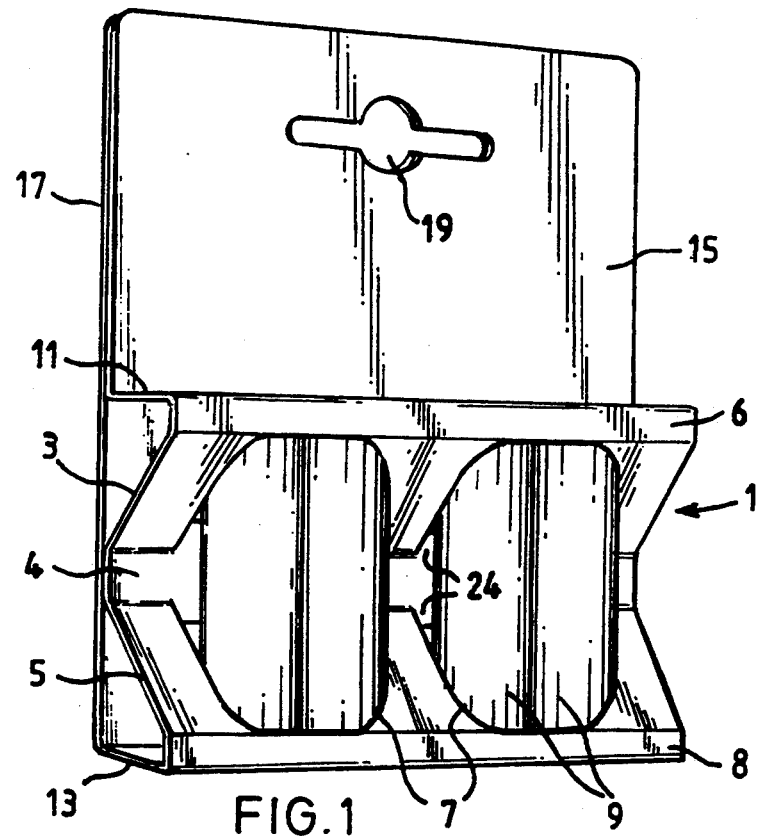
Figure 2:
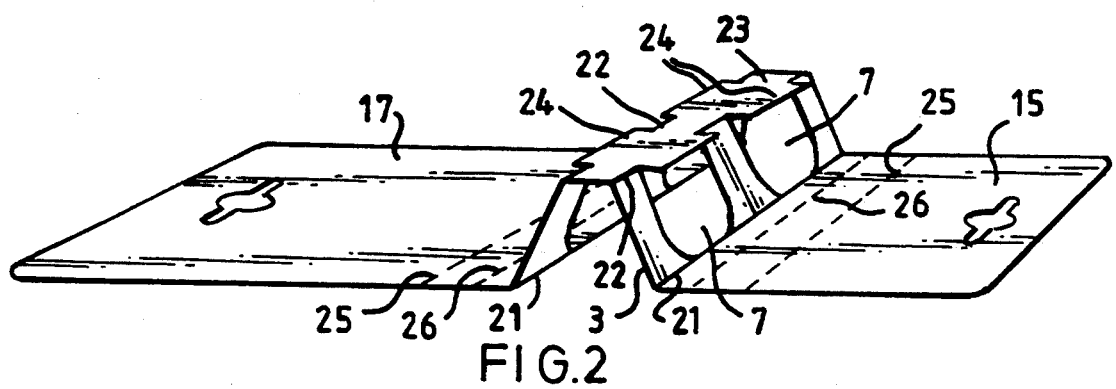

United States Patent [19]

Paumen et al.

[11] Patent Number: 5,428,940
[45] Date of Patent: Jul. 4, 1995

[54] PACKAGING

[75] Inventors: Jacky M. G. N. Paumen, Begijnenoijk; Rowland Hemming, Brussels, both of Belgium; Kai Hartmann, Weitnau-Wengen, Germany; Marc Beckers, Varese, Italy

[73] Assignee: Duracell Inc., Bethel, Conn.

[21] Appl. No.: 802,018

[22] Filed: Dec. 3, 1991

[51] Int. Cl.⁶ ............................................. B65B 21/00
[52] U.S. Cl. ...................................... 53/398; 53/456; 53/452; 206/45.14
[58] Field of Search .......................... 53/398, 452, 456; 206/333, 45.14

[56] References Cited

U.S. PATENT DOCUMENTS

| | | | |
|---|---|---|---|
| 3,887,067 | 6/1975 | Collura et al. | 206/45.14 |
| 3,918,583 | 11/1975 | Adams | 206/491 |
| 3,990,578 | 11/1976 | Roeser | 206/45.14 |
| 4,300,683 | 11/1981 | Roccaforte | 206/485 |
| 4,362,239 | 12/1982 | Roccaforte | 206/45.14 |
| 4,627,536 | 12/1986 | Pugh | 206/45.14 |
| 4,629,069 | 12/1986 | Pugh | 206/45.14 |
| 4,736,846 | 4/1988 | Durand | 206/45.14 |

Primary Examiner—John Sipos
Assistant Examiner—Gene L. Kim
Attorney, Agent, or Firm—Ronald S. Cornell; Barry D. Josephs

[57] ABSTRACT

A package for a battery or other article, comprising a sheet of material bent or folded along a plurality of substantially parallel fold lines 21, 22, 25, 26 to define an upwardly extending substantially flat panel region 15, an upper end locating region 11 extending forwardly from the lower extremity of the said panel region, a first limb 3 extending obliquely downwardly and rearwardly from the forward extremity of the end locating region, a second limb 5 extending obliquely forwardly and downwardly and defining with the first limb a V-section channel region, a lower end locating region 13 extending rearwardly from the lower limb, and a rear panel region 17 extending upwardly from the rear extremity of the lower end locating region and secured to the first mentioned panel region 15. The limbs have aligned openings 7 shaped to fit closely about at least the forward circumference of said article, with the rear portion of said article positively located by said openings and/or by the said rear panel region and/or by material of said sheet at the juncture of said limbs. The sheet is initially set with a small angle between the limbs to facilitate insertion of the battery, then the angle between the limbs is increased so that the edges of the openings 7 press against the front of the battery.

1 Claim, 6 Drawing Sheets

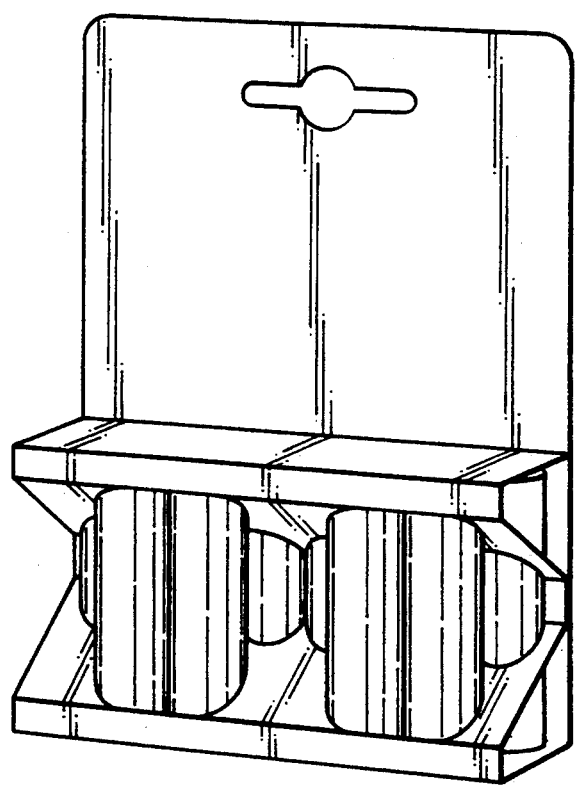
F I G. 6
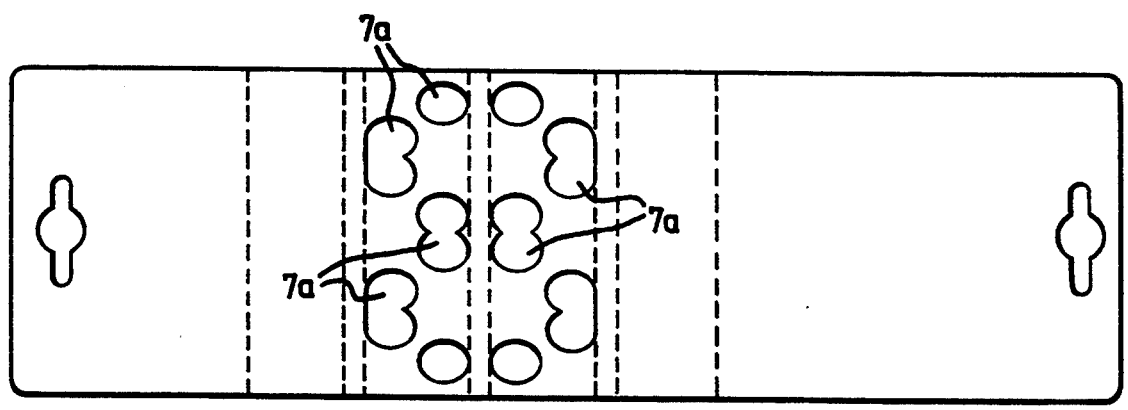
F I G. 7

PACKAGING

This invention relates to packaging, and in particular to the packaging of batteries and other consumer products.

At present, batteries and other products are commonly packaged for sale in blister packs, with blisters made for example of transparent PVC on a card base.

However it is considered that conventional blister packs are environmentally undesirable, and in particular they are made from a mixture of materials, not easily separable, which hinders waste disposal and recycling. Furthermore PVC is derived from non-renewable resources, and is not readily biologically degradable, so that discarded packs cause problems of disposal and litter.

An object of the present invention is to provide a form of packaging suitable for batteries, which is capable of being made of a single material, preferably one which is biodegradable, and is derivable from renewable resources, in particular cardboard or other sheet material of vegetable origin.

According to the present invention, a package for a battery or other article comprises a sheet of material shaped to form a region of channel cross section, with aligned openings in opposite walls of the channel to receive end regions of a packaged article inserted in the openings, and end locating means for retaining the article in the openings. The channel-configuration provides for reliable retention of the end regions of the article while exposing a large intermediate region of the article, so that a customer can see the article when displayed for sale or when stored.

Preferably, the sides or edges of the openings make close contact with and conform to at least part of the circumference of the article, so as to restrain the article against rotating or otherwise moving in the openings (even if the article is of circular cross-section). In this way, the articles can be held reliably in a desired orientation, for example with a Trade Mark facing forwards. This is a significant advantage in the packaging of batteries and other consumer goods.

The article may be retained by folded-over end regions of the sheet material integral with the walls of the channel.

In a preferred arrangement, these folded-over end locating or retaining regions of the sheet material are further integral with extended flat panel regions of the sheet, forming display or information-carrying areas and arranged to ensure that the channel and the end locating or retaining regions retain their shape in which they hold the packaged article.

Preferably, the channel is of V section, with the said openings in opposite limbs of the V. This configuration is particularly simple, and easy to manufacture.

It is to be understood that more than one article can be packaged in a similar manner using a single package provided with multiple pairs of aligned openings, arranged for example side by side. Thus, packages of two, four or eight batteries can be provided in an arrangement generally analogous to conventional blister packs for batteries. The or each pair of aligned openings may accommodate two or more articles.

Preferably, the package is made by a sequence of folding operations on a sheet of cardboard or similar material. For inserting the article to be packaged, in a preferred embodiment the sheet is initially folded to define an intermediate V-section region provided with the said aligned apertures in opposite limbs, with a relatively small angle between the limbs; the article is inserted through the apertures which in this configuration permit easy insertion of the article; the V is then flattened so that the angle between the limbs of the V is increased and the limbs may grip the article and thereafter the remainder of the sheet of packaging material is folded and, if appropriate, glued or otherwise secured, into its desired final form.

According to another aspect of the present invention, a package comprises first and second strips of material extending transversely to one another and each folded to form a substantially closed frame, the article or articles to be packaged being accommodated within the said frames. Preferably, the article is or articles are exposed at openings formed between limbs of the respective frames.

The strips may be separate from one another or may be integral with one another at an intersection or junction region in a cross-shaped arrangement.

The package can be assembled by first folding a first strip to form a first frame, fitting the article or articles to the said frame, then folding the second strip, in a plane at right angles to the first strip, to form a second frame retaining the article or articles within the first frame.

The strips may be provided with respective end regions arranged and adapted to form partitions between regions of the frames and/or projecting regions to form panels for display and/or handling.

Packs of this nature are particularly suitable for packaging two or a larger even number of larger articles for example batteries of size MN1300 and MN1400.

For packaging larger numbers of batteries or other articles, a plurality of parallel strips may be provided to form corresponding parallel frames.

Figure 8:
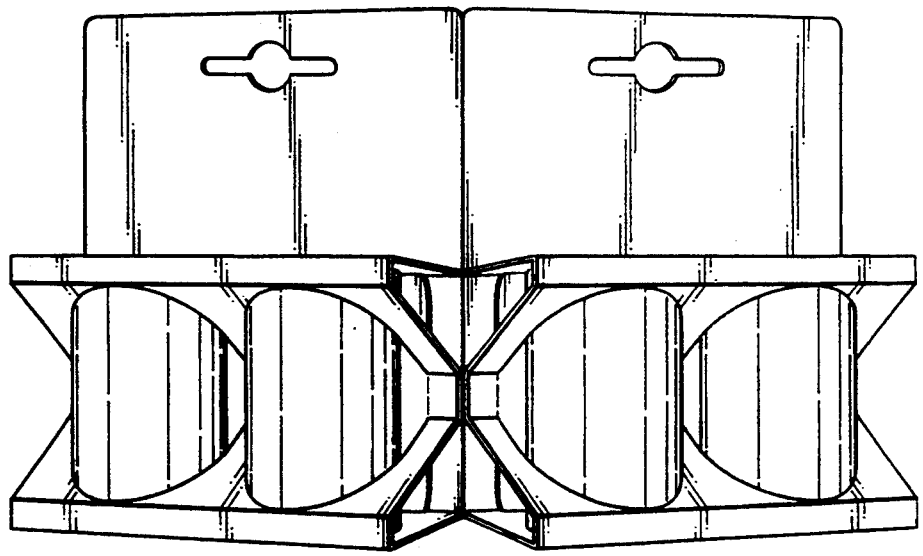
Figure 9:
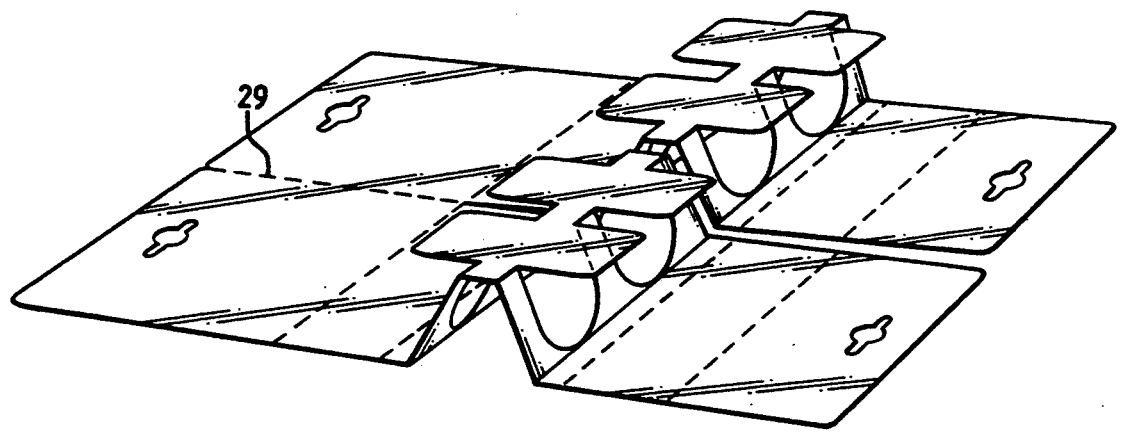
Figure 10:
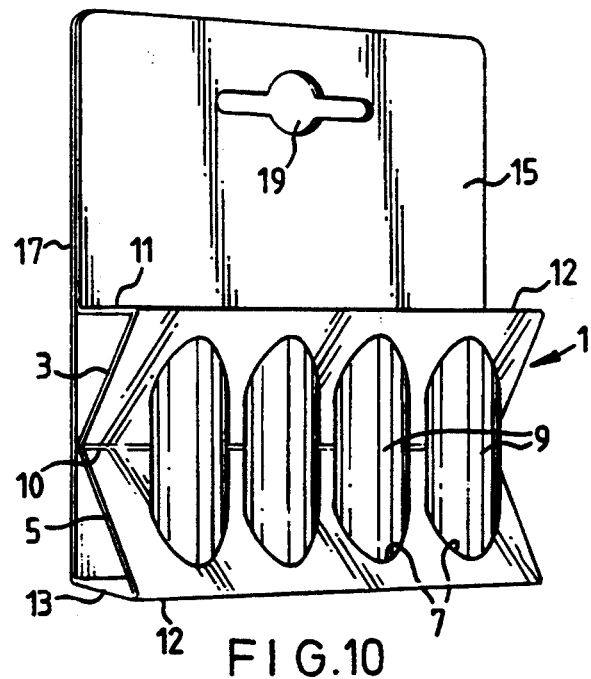
Figure 11:
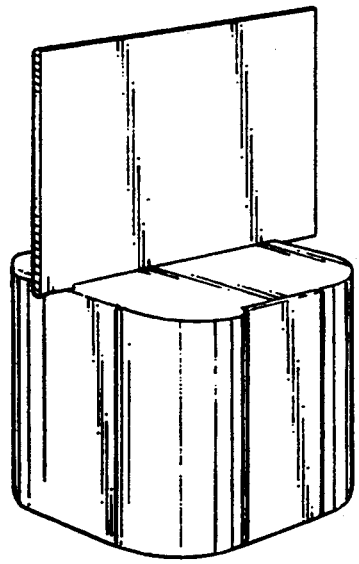

The invention will be further described, by way of example, with reference to the accompanying drawings in which:

FIG. 1 shows a pack of four small batteries,
FIG. 2 to 5 show stages in the formation of the pack,
FIG. 6 shows a pack of eight small batteries,
FIG. 7 shows a blank for making the pack of FIG. 6,
FIG. 8 shows a pack of four large batteries,
FIG. 9 shows a blank for making the pack shown in FIG. 8.
FIG. 10 shows a modification of the pack shown in FIG. 1, and
FIGS. 11 to 16 show another form of pack for four large batteries, and stages in forming it.

FIG. 1 shows a pack of four batteries, suitable for packaging AA or AAA size batteries.

The batteries are held by a pack made from a single sheet of cardboard or similar material. The pack comprises a V-shaped region 1, comprising two limbs 3, 5 with an obtuse angle between them. In each limb there are two openings 7, aligned in pairs so that each opening in one limb is opposite a matching opening in the other limb.

Within these openings are housed respective end regions of batteries 9 arranged in pairs. One pair for each pair of opposite openings 7.

It will be seen that most of the length of each battery is exposed to view between the limbs 3, 5. Thus the batteries are readily visible to a purchaser or user.

The sides of each battery, at least over its forward and outer quarter-circumference, are closely embraced by, and positively located at least at the side and the front by, the edges of the apertures 7. In the illustrated case, each aperture has two parallel straight side portions extending rear to front, two forward side portions each a quadrant of an ellipse conforming to a quadrant of a battery circumference, and a straight front portion interconnecting the forward side portions. Only the forward side portions touch the batteries.

At the rear the battery rests against and is positively located by a rear region of the pack, namely a web 4 and/or a rear panel 17. Alternatively or additionally the battery is positively located at the rear by edges of a rear portion of the aperture 7 if the latter is shaped to conform to the battery at the rear, as is the case in the packages shown in FIGS. 6 and 7 and in FIG. 10.

Thus, the batteries are firmly and positively located on all sides in the pack. In particular, even though they are of circular cross-section, the close contact and resulting friction between the side or circumferential surfaces of the batteries and the edges of the apertures 7 and the rear region of the pack ensure that the batteries cannot rotate within the apertures; thus the batteries are reliably held in their original orientations, normally with their Trade Marks facing forwards towards potential buyers.

Integral with the outer end of each limb of the V, is a rearwardly bent or folded locating region 11, 13 of the sheet. These regions 11, 13 lie adjacent the ends of the batteries, holding these in place axially in the openings 7. In the illustrated example, the regions 11, 13 are parallel to one another. However, these regions may alternatively converge slightly towards one another, towards the rear of the pack, or may diverge towards the rear of the pack. It will be readily understood that the batteries cannot be removed without visible damage to the pack; this provides protection against theft of batteries from packs.

The region 11 is integral with a front panel region 15 of the sheet which extends upwardly from the V-section region 1 carrying the batteries. The region 13 is integral with a rear panel 17 which extends upwardly behind the V-shaped region and the front panel 15 and is secured to the rear face of the latter, for example by an adhesive or by staples.

The panel regions 15, 17 form a substantially rigid element ensuring that the V-section region 1 and the regions 11, 13 hold the illustrated shape, in which they positively locate and retain the batteries.

The flat region formed by the panel regions 15, 17 above the batteries is provided with an aperture 19 by which the entire pack can be hung on a display stand. The surfaces of the panel regions can be provided with information and promotional material, trade marks and so on.

In the illustrated embodiment, the limbs 3, 5 are connected to one another by a narrow web 4, which lies against and may be adhered to or stapled to the rear panel 17. The forward extremity of each limb 3, 5 is connected to the end locating region 11 or 13 by a narrow flat web 6, 8, which may be parallel to or inclined relative to the panel regions 15, 17.

The openings 7 may be formed by completely removing the corresponding material. However, it is preferred that at least part of the material originally within the area of each aperture be retained, integral with the web 4 and extending upwardly and/or downwardly from the web, so as to lie against and optionally be attached to the rear panel 17 in order to provide a stronger and in particular more rigid structure. This structure will be seen more clearly from FIGS. 2 to 5.

FIGS. 2 to 5 illustrate the manufacture of the battery pack.

The starting material is a flat rectangular sheet of cardboard. In a transverse intermediate region, closer to one end than to the other, the sheet is cut or punched to form two parallel rows of two openings 7. Each of these openings has the shape already described, with the major axes of the ellipse quadrants perpendicular to the longitudinal direction of the row of openings, the minor axes having a length equal to the diameter or other transverse dimensions of the article to be packaged. Before or after the formation of the openings, the said intermediate region is folded along two parallel lines 22 placed symmetrically between the rows of openings. Accordingly the said intermediate region is formed into a V-section shape with aligned openings 7 in opposite Limbs of the V.

Between the rows of openings is a narrow web 4 defined by the fold lines 22. On opposite sides of this are integral tabs 24 coplanar with the web, each tab being formed by a portion of the material originally present within the area of an aperture 7. These tabs extend the area of the web 4.

Figure 3:
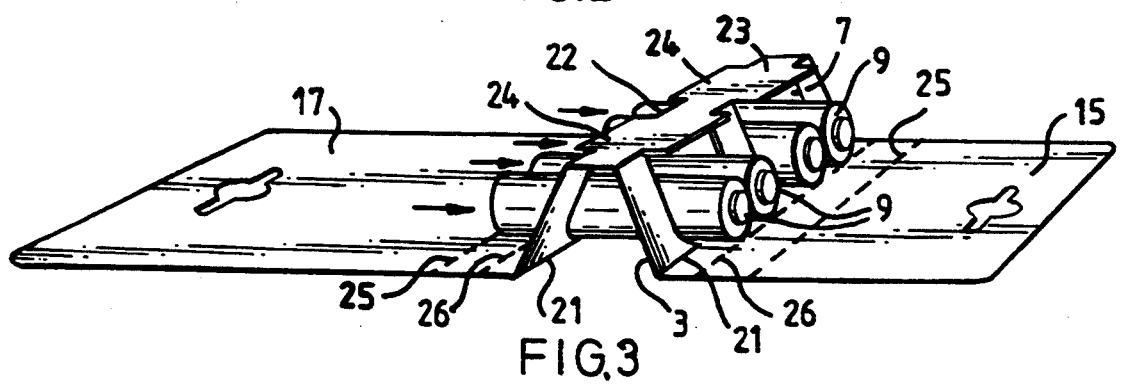

With the limbs 3, 5 of the V-section region at a relatively small included angle, in general an acute angle, the batteries to be packaged are inserted in pairs longitudinally into respective pairs of aligned openings 7, as shown in FIG. 3. Because of the small angle between the limbs of the V, the batteries fit relatively loosely within the openings and thus can be inserted easily.

Before (or after) insertion of the batteries, the sheet is also folded along transverse lines 21 parallel to the fold lines 22 of the web 4 at the apex of the V, and in the opposite direction to the folds along the web fold lines 22.

Preferably, folding along the lines 21 is performed before the batteries are inserted, and in such a way that the end regions 15, 17 of the sheet outside these fold lines are flat and coplanar with one another, and parallel to web 4, to facilitate manipulation and location of the sheet.

Figure 4:
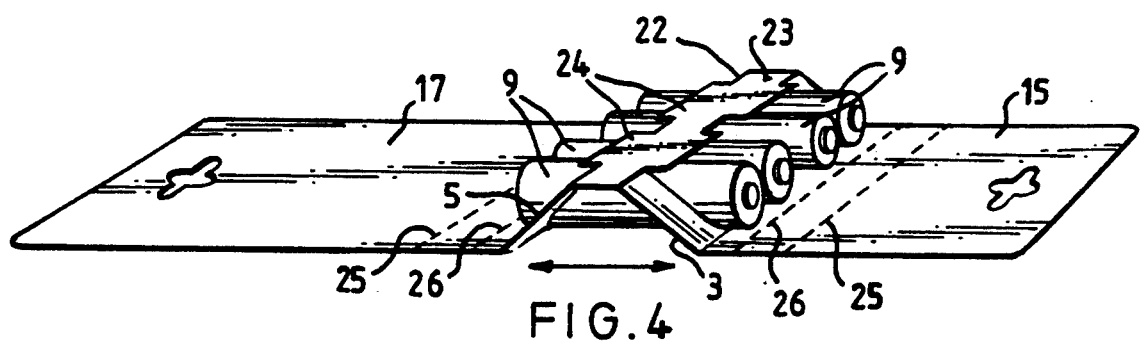
Figure 5:
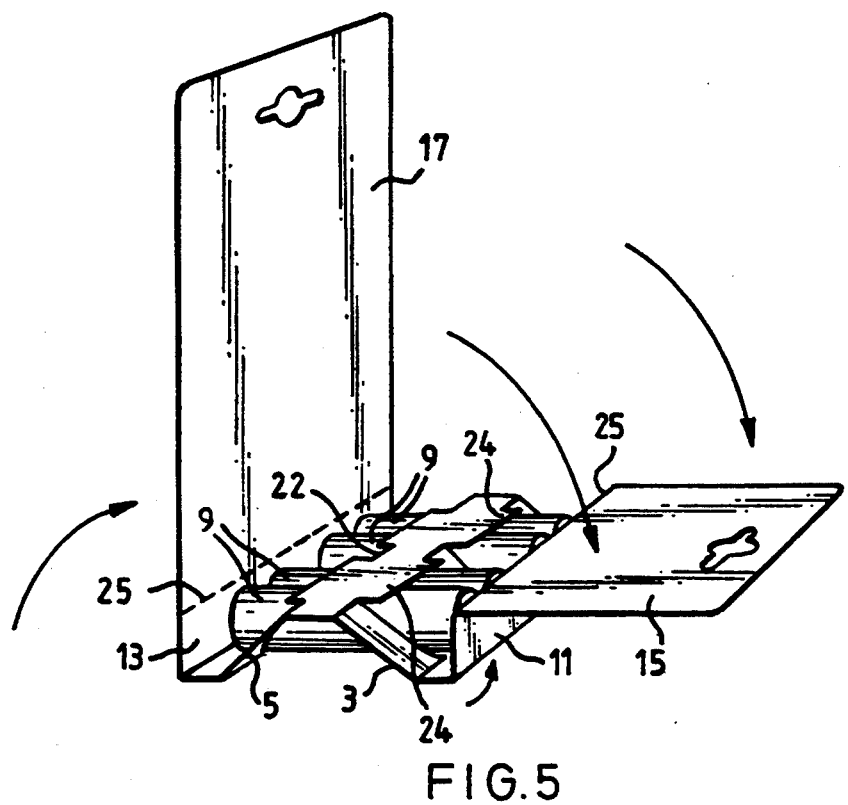

After insertion of the batteries, the V-section region is flattened, that is to say the angle between the limbs 3, 5 of the V is increased, preferably to an obtuse angle, by moving the regions 15, 17 away from one another, as shown in FIG. 4. This causes the edges of the forward major-axis end regions of the part-elliptical openings 7 to move into contact with the fronts and sides of the inserted batteries and to press the rear of each battery against the web 4, to hold the batteries firmly against rotation in the openings and to expose a large area of each battery between the limbs of the V.

The regions 15, 17 of the sheet are then folded on fold lines 26 parallel to the fold lines 21, so that the regions of the sheet adjacent the fold lines 26 now lie at right angles to their original orientation and are adjacent opposite ends of the batteries, forming the end retaining regions 11, 13 shown in FIG. 1. These regions 11, 13 cannot move away from the ends of the batteries (except by unfolding the sheet), because the limbs of the V are restrained against corresponding further movement by their engagement with the peripheries of the batteries. Consequently, in this configuration the batteries are positively located against any significant movement.

The sheet is then folded again, along respective fold lines 25 each parallel to and spaced from one of the fold lines 26, thereby delimiting the regions 11, 13. The smaller end region 15 of the sheet is folded forwards (downwards and to the right in FIG. 5) so as to extend away from, and parallel to the longitudinal axes of, the batteries. The larger end region 17 is folded in the same direction as the region 15 so as to lie behind the batteries and behind the region 15. The dimensions of the sheet and the positions of the fold lines are so selected that, after the final folding, the edges of the region 17 are in register with those of the region 15, as shown in FIG. 1. The regions 15 and 17 and the web 4 with tabs 24 are then glued or otherwise fastened together to form a stiff panel.

The illustrated package accommodates a single article, or a single line of articles.

In a modified arrangement, the V-section region may accommodate two or more parallel lines of articles, one behind another. Thus, by providing two parallel rows of holes 7 in each limb region 3, 5, one can provide a single pack which will accommodate any desired number, for example eight cells in two rows of four. Such a pack is particularly convenient for cells of the smaller sizes.

In a further modification, individual openings 7 may accommodate a single cell or other article. This modification is particularly applicable to the packaging of relatively large articles and in particular cells of larger types such as MN 1300/1400.

In the case of cells or other articles packaged in multiple rows, the forward projection of the pack from the panel region can be reduced, by staggering the openings in adjacent rows, in the longitudinal direction of the rows.

FIG. 6 illustrates a modified pack capable of accommodating eight cells of the AA or AAA size. This pack contains several of the above-mentioned modifications. Thus, it has two parallel rows of holes for four batteries each; in each row at least one hole 7a is shaped to fit two batteries side by side; and the holes in each row are staggered relative to those in the adjacent row. FIG. 7 shows the corresponding cardboard blank. In this case each aperture conforms to the entire periphery of the batteries, at the rear as well as at the front.

In another modification, the pack may be provided in the front and/or back panel with a hinge or fold line 29 perpendicular to the lines 21, 22, 25, a cut being made on this line where it intersects the regions 3, 4, 5, 11, 13 which project forwards from the panel regions 15, 17 and optionally in one of the panel regions 15, 17, in particular the front panel 15. This modification consequently provides, in effect, a pack with two regions side by side, which can optionally be folded to lie back to back. Such a pack can be used as a double-face pack with two peg holes, or as a back-to-back pack carrying articles on both front and back, or can be divided along the vertical fold line 29.

A pack of this nature is suitable for packaging larger articles such as batteries of MN1300 and MN1400 size for example as a four-pack. FIG. 8 shows such a pack, and FIG. 9 shows the corresponding cardboard blank at the stage of manufacture corresponding to FIG. 2. The blank and the method of manufacture correspond generally to those of FIGS. 1 to 16.

FIG. 10 shows a pack generally similar to that shown in FIG. 1. However in this embodiment, the webs 4, 6, 8 are absent. Instead, the limbs 3, 5 meet at a single sharp apex or fold line 10, and similarly the limbs 3, 5 meet the regions 11, 13 at single sharp apices or fold lines 12.

Furthermore respective end regions of individual batteries 9 are held in individual openings 7: in each limb there are four elliptical openings 7, aligned in pairs so that each opening in one limb is opposite a matching opening in the other limb.

For packaging batteries or other articles of different shapes, the openings 7 would of course be shaped to match the peripheral contour of the article or articles. Thus, batteries and other articles of rectangular cross-section would require openings of rectangular shape.

FIGS. 11 to 16 show an alternative form of pack for packaging four cells of larger diameter, specifically MN1300 and MN1400. This pack is intended to provide enhanced strength in view of the size and weight of these cells, and to provide the maximum number of batteries on display within a limited overall width (typically limited to 90 mm), with a substantial area of each cell visible to the purchaser or user.

FIGS. 12 to 16 illustrate the manufacture of the pack shown in FIG. 10.

Figure 12:
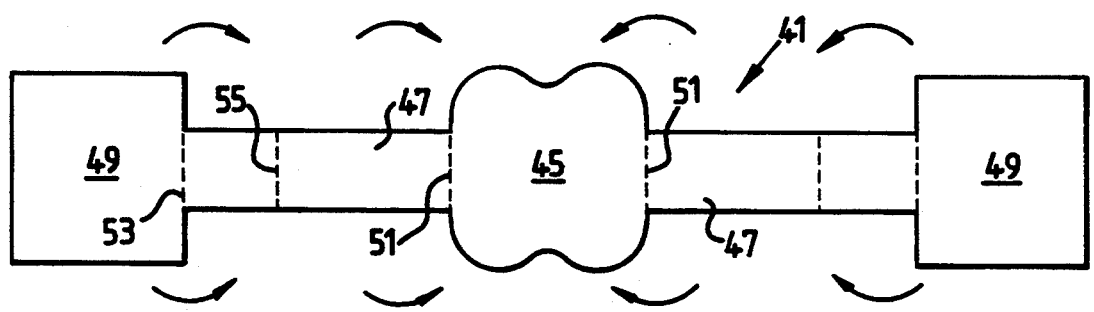
Figure 13:
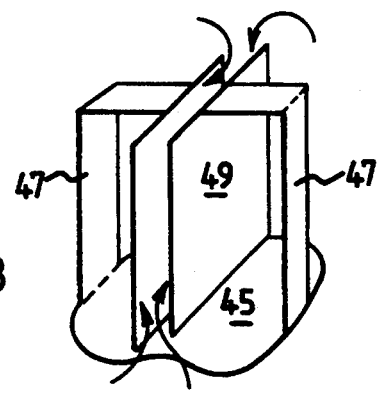
Figure 15:
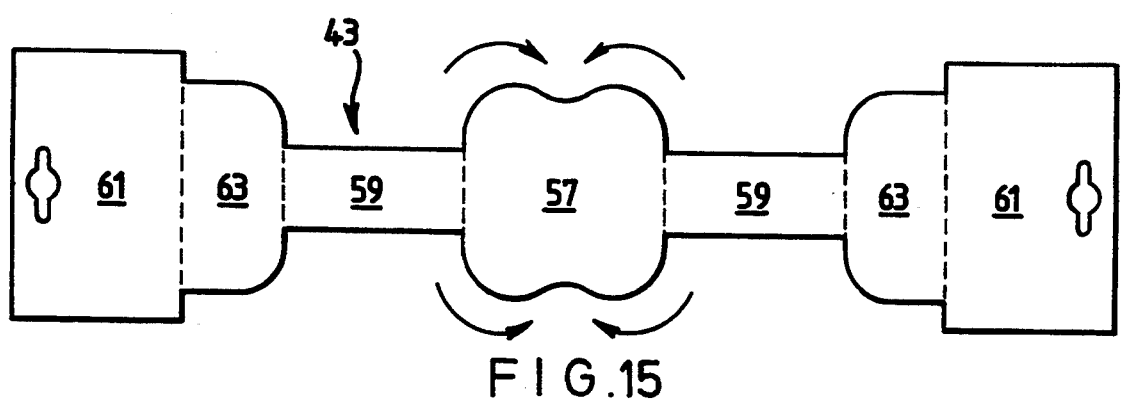

This pack is made from two separate strips 41, 43 of cardboard having the shapes shown in FIGS. 12 and 15.

The first strip 41 has a central region 45 which is generally rectangular but with a rounded edge profile to match the peripheral profile of four cells placed side-by-side in a square array. From two opposite sides of the region 45 extend respective narrower strips 47 each terminating in a larger rectangular region 49 having a width substantially equal or slightly smaller than to that of the region 45, in the direction perpendicular to the longitudinal extent of the strip 41.

Each strip 41 is folded inwards towards the central region 45, through 90° about each of respective fold lines 53 at the junction of region 47 with the end region 49, 55 at an intermediate position spaced from the central region 45 by a distance equal to the height of a cell, and 51 at the junction of strip 47 with the central region 45, to form a rectangular frame with a central transverse partition defined by the inwardly folded end regions 49, as shown in FIG. 12, with the region 45 forming the base of the frame. The end or partition regions 49 are preferably secured to one another for example by an adhesive, and may additionally be secured to the central or base region 45, though this latter step is not essential.

Figure 14:
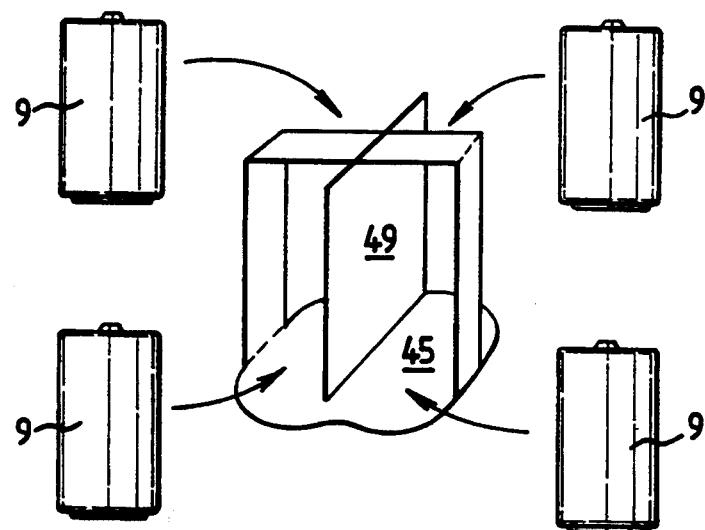

The frame structure thus formed, as shown in FIG. 14, then has four cells 9 placed within it, standing on the base region 45. Alternatively these cells may be placed on region 45 before the folding operation.

The second strip 43 has a shape and size generally similar to the strip 41 comprising a central base region 57, opposite narrower regions 59, and enlarged end regions 61. In this case the end regions 61 are somewhat wider than the central base region 57, the narrowest regions 59 are of a length equal to the height of a cell, and between the regions 59 and 61 are regions 63 having a width (perpendicular to the longitudinal extent of the strip 43) substantially equal to the region 57 and a length, in the longitudinal direction of the strip 43, substantially equal to the diameter of a single cell.

Figure 16:
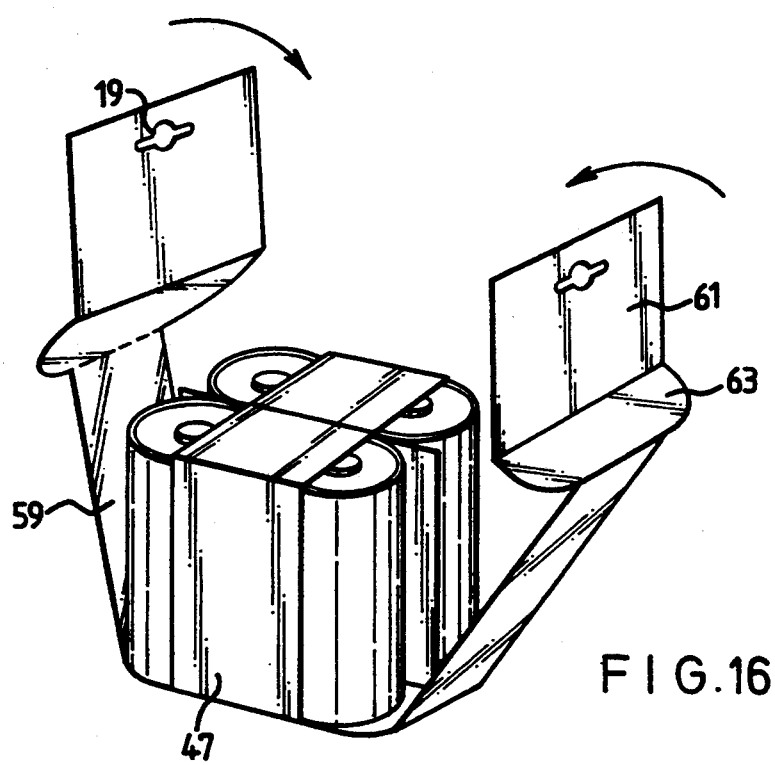

The strip 43 is folded in the manner shown in FIG. 16, generally similar to the folding of the strip 41 with the difference that the end regions 61 are folded in the opposite direction to the other folds of the strip, so as to stand upwards from the generally rectangular frame formed by folding the regions 57, 59, 63. This second frame formed from the strip 43 is disposed in a plane perpendicular to the frame formed from the strip 41, and is assembled with the latter frame and the cells placed in it, with the base region 45 resting on, and optionally secured to, the base region 57. Thus, with the regions 61 fastened together, the two frames locate and restrain the four cells in three dimensions, while leaving a substantial amount of each cell visible in the corner regions of the pack, exposed between the frame limbs formed by the regions 47, 59 of the respective folded strip. The second frame may be formed by folding the strip 43 before or after the base region 45 is placed on the base region 57.

The regions 61 form a top panel by means of which the pack can be suspended from a hole 19 in the panel and which can carry trade marks, promotional material and technical information.

Instead of two separate strips with respective central base-forming regions placed one on the other, the pack can be formed from a single blank of cardboard or other sheet material, comprising a central base-forming region with respective strip-like regions corresponding to the regions 47, 49 of strip 41 on the one hand, and the regions 59, 61, 63 of strips 43 on the other hand, extending from the central region in two directions at right angles in the shape of a cross. The package is then formed by folding the respective strip-like regions in a manner analogous to that described with reference to FIGS. 12 to 16.

To accommodate more than four articles, the pack may be formed for example from a first blank comprising a central base-forming region corresponding to the region 45 but extended in a direction perpendicular to the strip-like regions 47, and provided with a multiplicity of sets of regions corresponding to regions 47, 49 of strip 41, extending perpendicular to and spaced along the length of the common central base-forming region. This blank is folded in a manner analogous to the strip 41 to form a plurality of parallel frames, which are loaded with the articles to be packaged. The pack can then be completed by folding a further strip-like blank, analogous to the blank 43 shown in FIG. 15 but longer, around the unit formed by the first frames and packaged articles.

Alternatively, a pack for more than four articles may comprise a multiplicity of individual four-article/single frame assemblies as shown in FIG. 14, placed side-by-side with their respective frames parallel to one another, all enclosed within a single further frame formed by folding a blank analogous to that of FIG. 15 but of extended length as already described in the preceding paragraph.

In yet another modification, a multi-pack may comprise a plurality of individual pre-packs as shown in or analogous to that shown in FIG. 14, arranged side-by-side with their respective frames or a common enclosing frame lying in a single plane, and all enclosed within a plurality of further frames each at right angles to the said plane, formed from a blank analogous to that shown in FIG. 15 but with the central region 57 extended in a direction perpendicular to the side regions 59, and provided with a plurality of parallel side regions 59 etc. to form the plural parallel further frames.

What is claimed is:

1. A method of making a package for holding articles from a single sheet of a foldable stiff material comprising folding said sheet along a first intermediate line to create a V-shaped section, wherein apertures provided in each arm of the V-section are aligned and shaped to accommodate opposite end portions of the articles; inserting an article through a pair of aligned openings; increasing the angle of the V-section so that the perimeter of the apertures frictionally engage with the end portions of the article; and folding the sheet along additional intermediate lines parallel to the first intermediate line so that the sheet can be folded around and behind the articles and the V-section; and securing the folded sheet to itself whereby the increased angle of the V-section is maintained and the articles are held in place.

* * * * *